(12) United States Patent
Jiang et al.

(10) Patent No.: US 11,345,399 B2
(45) Date of Patent: *May 31, 2022

(54) STEERING CONTROL METHOD AND SYSTEM OF SELF-DRIVING VEHICLE

(71) Applicant: UISEE TECHNOLOGIES (BEIJING) LTD, Beijing (CN)

(72) Inventors: Yan Jiang, Beijing (CN); Jinzhan Peng, Beijing (CN); Xin Zhou, Beijing (CN); Dan Zhang, Beijing (CN); Xiaocheng Zhou, Beijing (CN); Sai Luo, Beijing (CN)

(73) Assignee: UISEE TECHNOLOGIES (BEIJING) LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,866

(22) Filed: Jan. 7, 2020

(65) Prior Publication Data

US 2020/0216115 A1 Jul. 9, 2020

Related U.S. Application Data

(63) Continuation of application No. 16/314,637, filed as application No. PCT/CN2016/088559 on Jul. 5, 2016, now Pat. No. 10,562,565.

(51) Int. Cl.
*B62D 6/10* (2006.01)
*B62D 6/08* (2006.01)
(Continued)

(52) U.S. Cl.
CPC .............. *B62D 6/002* (2013.01); *B62D 1/286* (2013.01); *B62D 6/08* (2013.01); *B62D 6/10* (2013.01)

(58) Field of Classification Search
CPC .................................................... B60W 30/09
See application file for complete search history.

(56) References Cited

U.S. PATENT DOCUMENTS 9,211,911 B2 * 12/2015 Stahlin .................... B62D 6/003
10,399,599 B2 * 9/2019 Zegelaar .................. B62D 6/10
(Continued)

FOREIGN PATENT DOCUMENTS

CN 102307774 A 1/2012

OTHER PUBLICATIONS

China National Intellectual Property Administration, Written Opinion of the International Searching Authority for International Application No. PCT/CN2016/088559 (English translation attached), 6 pages, dated Jul. 5, 2016.
(Continued)

*Primary Examiner* — Peter D Nolan
*Assistant Examiner* — Ce Li Ll
(74) *Attorney, Agent, or Firm* — MagStone Law, LLP; Enshan Hong

(57) ABSTRACT

The present disclosure provides for a steering control method and a steering control system for self-driving of a vehicle. The method comprises the steps of: obtaining information about an expected steering angle of a vehicle based on an automatic planning control operation; detecting whether an effective torque is applied to a steering wheel by a driver; and when it is detected that the driver has applied the effective torque to the steering wheel, computing a difference between a turning angle of the steering wheel controlled by the driver and the expected steering angle of a vehicle, and determining a self-driving intent prompt torque according to the difference between the two, wherein the self-driving intent prompt torque is to be applied to a steering system.

16 Claims, 3 Drawing Sheets

(51) Int. Cl.
*B62D 6/00* (2006.01)
*B62D 1/28* (2006.01)

(56) References Cited

U.S. PATENT DOCUMENTS

| | | | | |
|---|---|---|---|---|
| 2003/0164261 | A1* | 9/2003 | Takahashi | B62D 15/0245 180/443 |
| 2008/0035411 | A1* | 2/2008 | Yamashita | B62D 5/049 180/443 |
| 2011/0098890 | A1* | 4/2011 | Lee | B62D 1/286 701/42 |
| 2011/0118939 | A1* | 5/2011 | Kawamata | B62D 15/025 701/41 |
| 2011/0279254 | A1* | 11/2011 | Raste | B62D 7/159 340/438 |
| 2012/0323473 | A1* | 12/2012 | Irie | B60W 30/12 701/117 |
| 2013/0311072 | A1* | 11/2013 | Tochihara | B62D 5/0481 701/112 |
| 2014/0200770 | A1* | 7/2014 | Bahena | B62D 15/024 701/41 |
| 2016/0159389 | A1* | 6/2016 | Kuramitsu | B62D 5/049 180/446 |
| 2016/0162740 | A1* | 6/2016 | Takemura | G06K 9/00791 348/148 |
| 2016/0200354 | A1* | 7/2016 | Kimura | B62D 5/0472 701/42 |
| 2017/0036692 | A1* | 2/2017 | Kojo | B62D 6/06 |
| 2017/0088174 | A1* | 3/2017 | Inoue | B60T 8/17557 |
| 2017/0101131 | A1* | 4/2017 | Zegelaar | B62D 15/0265 |
| 2017/0106903 | A1* | 4/2017 | Moretti | B62D 1/286 |
| 2017/0174258 | A1* | 6/2017 | Yamada | B62D 1/286 |
| 2018/0118253 | A1* | 5/2018 | Minamiguchi | B62D 6/10 |
| 2018/0297631 | A1* | 10/2018 | Miyatani | B62D 5/0463 |

OTHER PUBLICATIONS

China National Intellectual Property Administration, International Preliminary Report on Patentability for International Application No. PCT/CN2016/088559 (English translation attached), 8 pages, dated Jan. 8, 2019.

* cited by examiner

STEERING CONTROL METHOD AND SYSTEM OF SELF-DRIVING VEHICLE

CROSS-REFERENCE TO RELATED APPLICATIONS

This application is a continuation of U.S. patent application Ser. No. 16/314,637, filed Dec. 31, 2018, which is a national phase application of International Application No. PCT/CN2016/088559, filed Jul. 5, 2016, each of which is hereby incorporated by reference in its entirety.

FIELD OF THE INVENTION

The present invention relates to the field of vehicle control, in particular to a steering control method and a steering control system for self-driving of a vehicle.

BACKGROUND

The development of vehicle technologies has facilitated productions and implementation of self-driving vehicles.

In an existing steering control system of a self-driving vehicle, a planning control system in the self-driving system computes a desired turning radius of the vehicle based on a sensing positioning result, and a steering wheel is rotated to a determined position under turning angle control.

Existing electric power steering (EPS) systems of vehicles may apply a steering assistance torque according to a driver's operations on the steering wheel to help the driver to turn the steering wheel with a small torque.

SUMMARY OF THE INVENTION

The inventors analyzed steering control systems of existing self-driving vehicles and concluded that ultimately the steering control systems aim to control the steering wheel to reach an expected turning angle no matter torque control or turning angle control is used. As a result, when the driver wants to intervene in the driving process, he must conflict with the self-driving system and grab the control on the steering wheel from the manipulator, which is not an ideal way to switch between manual driving and self-driving. As such, the existing self-driving systems can only work independently and cannot work in harmony with a human driver. This is because, in the conventional technology, when the expected turning angle of the self-driving system conflicts with the expected turning angle of the human driver, the self-driving system tries to cause the steering wheel to reach the expected turning angle (which means a deviation from the operation of the human driver), or exits the self-driving state (which means manual intervention to regain the control on the vehicle).

However, an existing EPS system of a vehicle can assist the driver only by means of the driver's input and cannot implement an active self-driving function.

The objective of the present invention is to overcome the disadvantages and shortcomings in the prior art, and to propose a new steering control method and a steering control system for self-driving of a vehicle so that the driver and the self-driving system jointly participate in the driving process.

According to an aspect of the present invention, a steering control method for self-driving of a vehicle is provided, specifically including:

firstly, a step for computing an expected vehicle steering angle, comprising obtaining information about an expected steering angle of a vehicle based on an automatic planning control operation;

secondly, a step for detecting a driver's steering wheel operation, comprising detecting whether an effective torque is applied to a steering wheel by a driver; and thirdly, a step for determining a self-driving intent prompt torque, comprising: when it is detected that the driver has applied the effective torque to the steering wheel, computing a difference between a turning angle of the steering wheel controlled by the driver and the expected steering angle of the vehicle, and determining a self-driving intent prompt torque according to the difference, wherein the self-driving intent prompt torque is to be applied to a steering system.

Further, the step of determining a self-driving intent prompt torque according to the difference may specifically include:

determining a larger self-driving intent prompt torque when the difference between the turning angle of the steering wheel controlled by the driver and the expected steering angle of the vehicle is larger, wherein the self-driving intent prompt torque is opposite to a torque that the driver needs to provide. Hence, if the difference is larger, the torque that the driver needs to provide is larger.

Further, when the driver has applied the effective torque to the steering wheel, the steering torque applied to the steering wheel may include a steering torque applied by the driver, a steering assistance torque of a vehicle steering assistance system, and the self-driving intent prompt torque.

Further, the self-driving intent prompt torque $\tau_c$ may be determined based on the following formula:

$\tau_c = -\text{sig}(\tau_{driver}) \cdot f(f \text{ abs}(\Delta\beta))$, wherein $\Delta\beta$ may be determined based on the following formula:

$$\Delta\beta = \beta_e - \beta_{driver}$$

wherein $\tau_{driver}$ denotes a torque currently applied by the driver, $\beta_e$ denotes an expected turning angle of self-driving, $\beta_{driver}$ denotes a turning angle where the steering wheel is located, and $\text{sig}(\tau_{driver})$ denotes the direction of the torque currently applied by the driver;

$f$ is a positive correlation function of an absolute value of $\Delta\beta$ and may satisfy the following conditions:

$$\begin{cases} f(0) = 0 \\ 0 \le f\text{abs}(\tau_c) \le f\text{abs}(\tau_{eps}) \end{cases}$$

wherein $\tau_{eps}$ denotes a steering assistance torque.

Moreover, the method may further include a step of determining a reliability status of operations of the self-driving system, specifically including:

in response to determining that an operating status of the self-driving intent prompt torque is a high-reliability status, increasing the self-driving intent prompt torque determined according to the difference between the two and outputted by a steering controller in the self-driving intent prompt torque determination step; or in response to determining that the operating status of the self-driving system is a low-reliability status, decreasing the self-driving intent prompt torque determined according to the difference between the two and outputted by the steering controller in the self-driving intent prompt torque determination step.

Further, the method for determining the reliability status of the operations of the self-driving system may be based on a complexity of a current self-driving road environment and a severity of a lighting condition.

Further, in the driver's steering wheel operation detecting step, when it is detected that the driver has not applied the effective torque to the steering wheel, the steering controller may control the turning angle of the steering wheel to reach the expected turning angle of the self-driving system.

According to another aspect of the present invention, a steering control system of a vehicle is provided, the system including:

an expected vehicle steering angle computation unit for obtaining information about an expected steering angle of a vehicle based on an automatic planning control operation;

a driver's operation detection unit for detecting whether an effective torque is applied to a steering wheel by a driver; and a self-driving intent prompt torque determination unit for, when it is detected that the driver has applied the effective torque to the steering wheel, computing a difference between a turning angle of the steering wheel controlled by the driver and the expected steering angle of the vehicle, and determining a self-driving intent prompt torque according to the difference, wherein the self-driving intent prompt torque is to be applied to a steering system.

Further, the self-driving intent prompt torque determined by the self-driving intent prompt torque determination unit may include:

a larger self-driving intent prompt torque determined when the difference is larger, wherein the self-driving intent prompt torque is opposite to a torque that the driver needs to provide, and thus if the difference is larger, the torque that the driver needs to provide is larger.

Further, when the driver has applied the effective torque to the steering wheel, the steering torque applied to the steering wheel includes a steering torque applied by the driver, a steering assistance torque of a vehicle steering assistance system and the self-driving intent prompt torque.

Further, the self-driving intent prompt torque determination unit may determine the self-driving intent prompt torque $\tau_c$ based on the following formula:

$$\tau_c = -\text{sig}(\tau_{driver}) \cdot f(f\ \text{abs}(\Delta\beta))$$

wherein $\Delta\beta$ may be determined based on the following formula:

$$\Delta\beta = \beta_e - \beta_{driver}$$

wherein $\tau_{driver}$ denotes a torque currently applied by the driver, $\beta_e$ denotes an expected turning angle of self-driving, $\beta_{driver}$ denotes a turning angle where the steering wheel is located, and sig ($\tau_{driver}$) denotes the direction of the torque currently applied by the driver;

$f$ is a positive correlation function of an absolute value of $\Delta\beta$ and may satisfy the following conditions:

$$\begin{cases} f(0) = 0 \\ 0 \leq f\text{abs}(\tau_c) \leq f\text{abs}(\tau_{eps}) \end{cases}$$

wherein $\tau_{eps}$ denotes a steering assistance torque.

Furthermore, the steering control system may further include a self-driving system operating status determination unit for determining a reliability status of operations of the self-driving system, wherein:

the self-driving intent prompt torque determination unit increases the self-driving intent prompt torque determined according to the difference and outputted by a steering controller in response to determining that an operating status of the self-driving system is a high-reliability status; or the self-driving intent prompt torque determination unit decreases the self-driving intent prompt torque determined according to the difference and outputted by the steering controller when the operation of the self-driving system is determined to be in a low-reliability status.

Further, the method for determining the reliability status of the operations of the self-driving system may be based on a complexity of a current self-driving road environment and a severity of a lighting condition.

Moreover, the steering control system may further include an automatic steering control unit for controlling the turning angle of the steering wheel to reach the expected turning angle of the self-driving system when the driver's operation detection unit detects that the driver has not applied the effective torque to the steering wheel.

Compared with the conventional EPS systems, the steering control method and control system for self-driving of a vehicle according to the embodiments of the present invention can inspect whether a driver's operations are consistent with self-driving expectations g according to computation results of the self-driving system, and determine a self-driving intent prompt torque to be applied according to a degree of inconsistency. As such, the steering control method and control system disclosed herein can prompt the driver of the steering intent of the self-driving system, instead of passively assisting the driver's operation only according to the driver's operations as in the EPS systems. Also, compared with the existing self-driving steering control systems, they can affect the torque to be applied by the driver through the change of the self-driving intent prompt torque, thereby prompting the human driver of the steering intent of the self-driving system, while ensuring the coexistence of the human driver and the self-driving to avoid conflicts or exit of the self-driving state due to the difference between the driver's steering intent and the self-driving steering intent in the past.

The steering control method and the steering control system according to the present invention may affect a human driving operation by changing the torque mode according to the expected steering angle computed by the self-driving system. The driver will not be forced to change his/her steering operations but can be prompted with a recommended driving behavior from the self-driving, and in most cases, the driver can participate in the process of steering control with nearly no operation, thereby improving the safety and comfort of a driving experience.

BRIEF DESCRIPTION OF THE DRAWINGS

These and/or other aspects and advantages of the present invention will become clearer and be understood more easily from the following detailed description of the embodiments of the present invention in combination with the accompanying drawings, in which.

DETAILED DESCRIPTION OF EMBODIMENTS

In order that those skilled in the art better understand the present invention, the present invention will be further described in detail below in combination with the accompanying drawings and specific embodiments.

Figure 1:
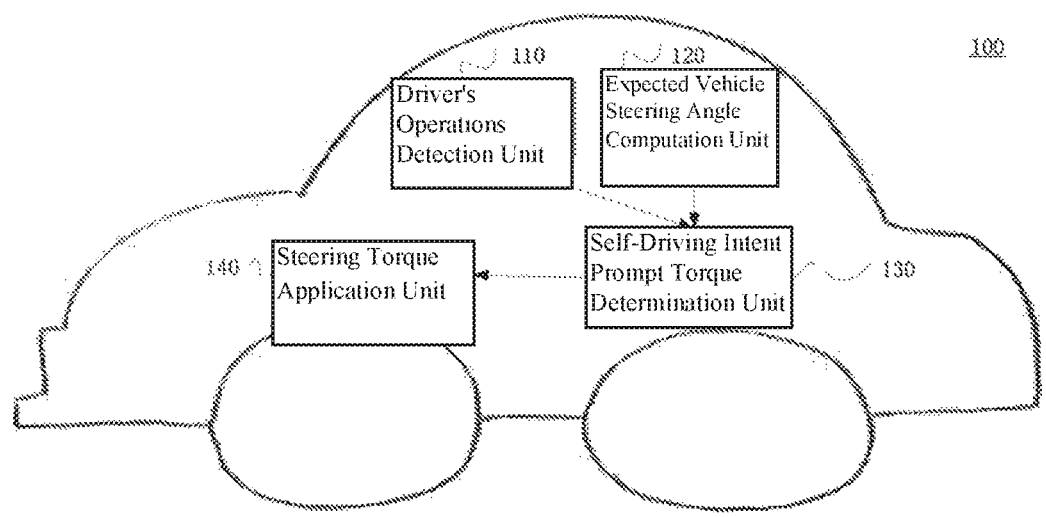
FIG. 1 is a flow chart of a steering control method for self-driving of a vehicle according to an embodiment of the present invention.

FIG. 1 is a schematic block diagram of a steering control system 100 for self-driving of a vehicle according to an embodiment of the present invention.

The steering control system 100 may include the following units: a driver's operation detection unit 110, an expected vehicle steering angle computation unit 120, and a self-driving intent prompt torque determination unit 130.

Optionally, the steering control system 100 may further include a steering torque application unit 140.

The driver's operation detection unit 110 may be configured to detect whether an effective torque is applied to a steering wheel by a driver.

Generally, a torque sensor is provided on the steering wheel. When the driver turns the steering wheel, the torque sensor may detect a torque input. At this time, it is determined that the driver is operating the steering wheel, that is, an effective torque is applied to the steering wheel. If the torque sensor does not detect a torque input, it may be determined that the driver does not operate the steering wheel, that is, no effective torque is applied to the steering wheel.

The expected vehicle steering angle computation unit 120 may be configured to obtain information about an expected steering angle of a vehicle based on an automatic planning control operation.

For example, the expected steering angle of the vehicle may be obtained based on a planning control operation carried out according to a sensing and positioning input.

The self-driving intent prompt torque determination unit 130 may be configured to compute a difference between a turning angle of the steering wheel controlled by the driver and the expected steering angle of a vehicle and determine a self-driving intent prompt torque according to the difference, when it is detected that the driver has applied the effective torque to the steering wheel, wherein the self-driving intent prompt torque is to be applied to a steering system.

In one example, when the self-driving intent prompt torque determination unit 130 determines a larger self-driving intent prompt torque when the difference between the turning angle of the steering wheel controlled by the driver and the expected steering angle of the vehicle is larger when determining a self-driving intent prompt torque, wherein the self-driving intent prompt torque is opposite to a torque that the driver needs to provide, so that the torque that the driver needs to provide is larger. Thus, when the driver operates the steering wheel, as the steering wheel gradually approaches the expected steering angle of the vehicle, the driver may feel more and more labor-saving and can thus realize that his driving process is consistent with the self-driving control intent. Otherwise, when the steering angle gradually deviates from the expected steering angle, the driver may feel more and more laborious and can thus realize that his driving process is contrary to the self-driving control intent.

After the driver realizes the self-driving control intent, he can determine whether he made a mistake in the previous operation. If he confirms that he did not make a mistake, he can make adjustments in time. If he confirms that his operation has not been mistaken, he can, for example, ignore the self-driving control intent, continue to operate as originally planned or temporarily turn off the self-driving control (for example, via an option button for exiting the self-driving control provided by the vehicle), and concentrate on driving the vehicle according to the driver's own intent.

In the conventional EPS systems, the torque for driving the steering of the wheel is composed of a steering torque applied by the driver and a steering assistance torque of the steering assistance system.

According to the steering control system of the embodiment of the present invention, when it is detected that the driver has applied the effective torque to the steering wheel, the self-driving system and the driver jointly participate in the steering process by applying the self-driving intent prompt torque.

According to an embodiment of the present invention, when the driver has applied the effective torque to the steering wheel, the steering torque applied to the steering wheel by the steering torque application unit 140 may include a steering torque applied by the driver, a steering assistance torque of a vehicle EPS system and the self-driving intent prompt torque.

That is, the steering torque at this time may be determined based on the following formula (1):

$$\tau = \tau_{driver} + \tau_{eps} + \tau_c \tag{1}$$

wherein $\tau_{driver}$ is a driver's steering torque, $\tau_{eps}$ is an EPS steering assistance torque, and $\tau_c$ is a self-driving intent prompt torque.

When the specified steering angle is zero, the torque may be zero, the counterclockwise torque is positive, and the clockwise torque is negative.

In one example, the self-driving intent prompt torque $\tau_c$ may be determined based on the following formula (2):

$$\tau_c = -\text{sig}(\tau_{driver}) \cdot f(f \text{ abs}(\Delta\beta)) \tag{2}$$

wherein $\Delta\beta$ is determined based on the following formula (3):

$$\Delta\beta = \beta_e - \beta_{driver} \tag{3}$$

wherein $\tau_{driver}$ denotes a torque currently applied by the driver, $\beta_e$ denotes an expected turning angle of self-driving, $\beta_{driver}$ denotes a turning angle where the steering wheel is located, and sig $(\tau_{driver})$ denotes the direction of the torque currently applied by the driver;

$f$ is a positive correlation function of an absolute value of $\Delta\beta$ and may satisfy conditions (4):

$$\begin{cases} f(0) = 0 \\ 0 \leq f\text{abs}(\tau_c) \leq f\text{abs}(\tau_{eps}) \end{cases} \tag{4}$$

wherein $c\tau_{eps}$ denotes a steering assistance torque, and $f$ abs($\tau_c$) denotes an absolute value of $\tau_c$.

According to the steering control system of the embodiment of the present invention, after the self-driving intent prompt torque is increased, the system may make the driver feels that it is more labor-saving to control the steering wheel to turn to the expected steering angle of the self-driving system, and that it is more laborious to control the steering wheel to turn opposite to the expected steering angle of the self-driving system.

In one example, the steering control system may adopt a self-driving intent prompt torque strategy in consideration of an operating state of the self-driving system in addition to the difference between the driver's operation and the expected turning angle of the self-driving system, and may change the magnitude of the self-driving intent prompt torque according to the reliability of the self-driving state, thereby changing the degree of participation of the machine driving in the driving process. The steering control system that determines the self-driving intent prompt torque in consideration of the operating state of the self-driving system will be described below in combination with FIG. 2.

Figure 2:
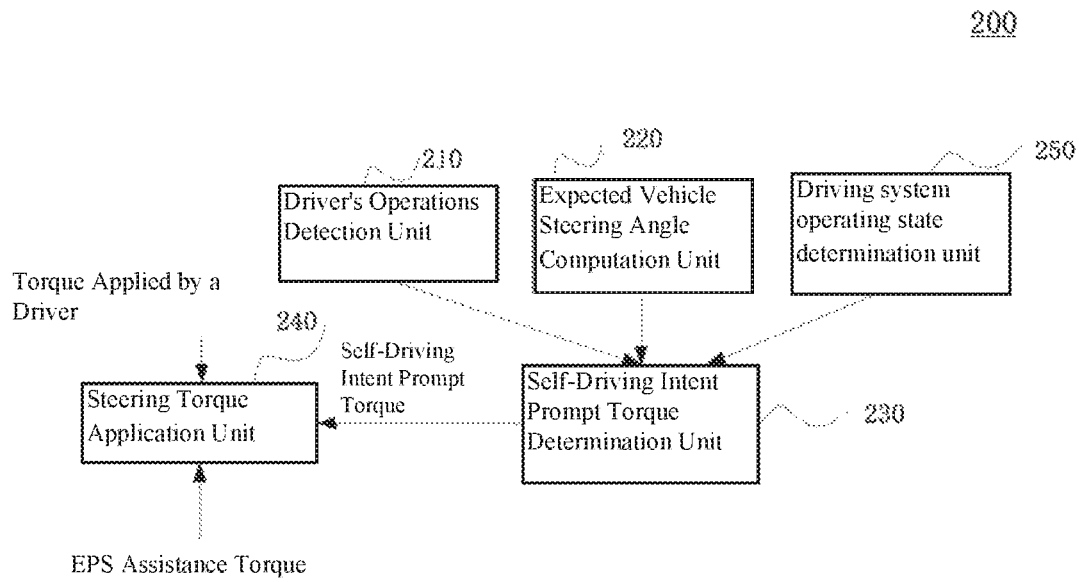
FIG. 2 is a structure diagram of a steering control system for self-driving of a vehicle according to an embodiment of the present invention.

FIG. 2 shows a structure diagram of a steering control system 200 that determines a self-driving intent prompt torque in consideration of an operating state of a self-driving system according to another embodiment of the present invention.

As shown in FIG. 2, compared with the steering control system 100 of FIG. 1, the steering control system 200 further includes a self-driving system operating state determination unit 250 besides the driver's operation detection unit 210, the expected vehicle steering angle computation unit 220, the self-driving intent prompt torque determination unit 230 and the optional steering torque application unit 240. The functions and working principles of the driver's operation detection unit 210, the expected vehicle steering angle computation unit 220 and the steering torque application unit 240 are similar to those of the corresponding units of FIG. 1, and are not redundantly described herein. The self-driving system operating state determination unit 250 and the self-driving intent prompt torque determination unit 230 will be mainly described below.

The self-driving system operating state determination unit 250 may be configured to determine a reliability status of operation of the self-driving system. For example, the self-driving system operating state determination unit 250 may determine a reliability status of operation of the self-driving system in combination with the surrounding environment (geography, weather, lighting, etc.) where the vehicle is located and/or feedback given by the driver, etc.

For example, if the self-driving system detects that the current environment is complex or the lighting condition is bad, the self-driving system operating state determination unit 250 may determine that there may be a high probability that the self-driving system is in a low-reliability operating state. Alternatively, if the self-driving system detects that the current environment is simple and the lighting condition is good, the self-driving system operating state determination unit 250 may determine that the self-driving system is in a high-reliability operating state.

When the self-driving system operating state determination unit 250 determines that there is a high probability that the self-driving system is in a low-reliability operating state, the self-driving intent prompt torque determination unit 230 may reduce (lower) the amplitude of the self-driving intent prompt torque, and the system at this time may be similar to the conventional EPS systems. Alternatively, when the self-driving system operating state determination unit 250 determines that there is a high probability that the self-driving system is in a high-reliability operating state, the self-driving intent prompt torque determination unit 230 may increase the magnitude of the self-driving intent prompt torque to provide an obvious enhanced driving experience for the driver's steering operations.

As an example, the steering control system for self-driving of the vehicle according to an embodiment of the present invention may further include an automatic steering control unit for, when the driver's operation detection unit does not detect that the driver has operated the steering wheel, i.e., the driver has not applied the effective torque to the steering wheel, controlling the turning angle of the steering wheel to reach the expected turning angle of the self-driving system, and the automatic steering control unit at this time is consistent with the conventional self-driving steering control system in function.

Figure 3:
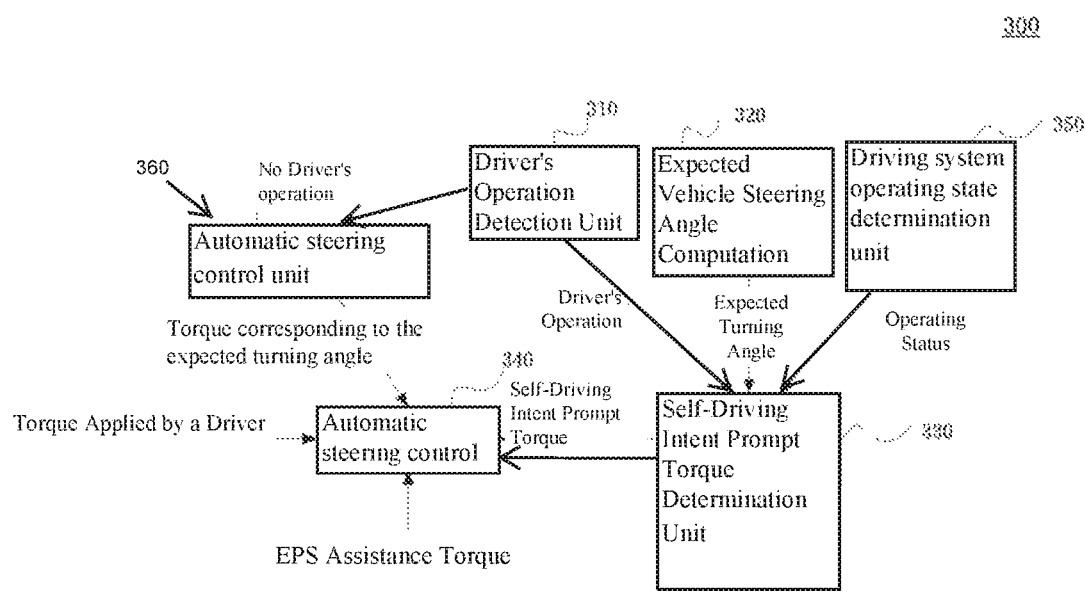
FIG. 3 is a schematic structure diagram of a steering control system 300 including an automatic steering control unit according to an embodiment of the present invention.

FIG. 3 is a block diagram schematically showing a steering control system 300 including an automatic steering control unit according to an embodiment of the present invention.

Compared with the steering control system 200 of FIG. 2, the steering control system 300 of FIG. 3 may further include an automatic steering control unit 360. The automatic steering control unit 360 may receive the monitoring result of the driver's operation detection unit 310, and controls the steering torque application unit 340 to apply a torque corresponding to the turning angle determined by the self-driving system in the expected direction of the vehicle to the steering wheel when the driver's operation detection unit 310 does not detect that the driver has operated the steering wheel, i.e., the driver has not applied the effective torque to the steering wheel, so that the steering wheel may reach the expected turning angle of the self-driving system. The torque applied by the steering torque application unit 340 at this time does not include the aforementioned torque applied by the driver, the EPS assist torque and the self-driving intent prompt torque.

A steering control method in accordance with the above-described steering control system according to an embodiment of the present invention will be described below in combination with FIG. 4.

Figure 4:
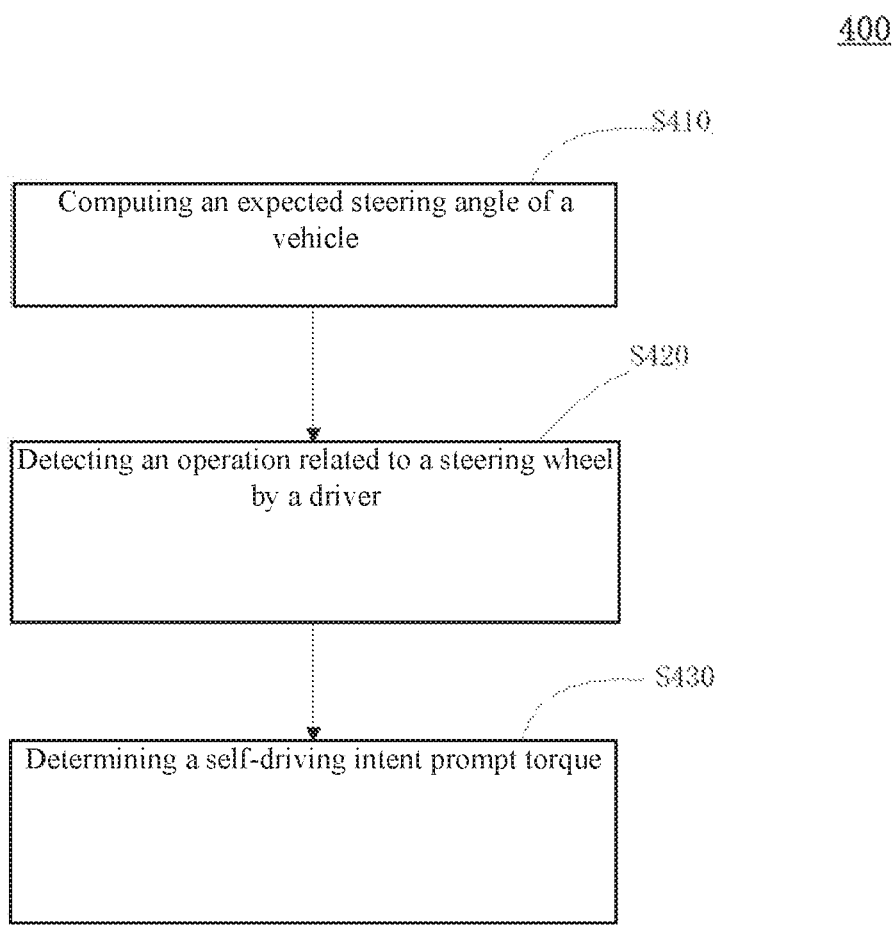
FIG. 4 is an overview flow chart of a steering control method for self-driving of a vehicle according to an embodiment of the present invention.

FIG. 4 is a generic flow chart of a steering control method for self-driving of a vehicle according to an embodiment of the present invention.

As shown in FIG. 4, an embodiment of the present invention provides a steering control method for self-driving of a vehicle, including steps S410 to S430.

In step S410, information about an expected steering angle of a vehicle may be obtained based on an automatic planning control operation.

In step S420, whether an effective torque has applied to a steering wheel by a driver is detected.

In step S430, when it is detected that the driver has applied the effective torque to the steering wheel, a difference between a turning angle of the steering wheel controlled by the driver and the expected steering angle of the vehicle is computed, and a self-driving intent prompt torque is determined according to the difference between the two and applied to a steering system.

According to the steering control method of the embodiment of the present invention, when it is detected that the driver has applied the effective torque to the steering wheel, the self-driving system and the driver jointly participate in the steering process by applying the self-driving intent prompt torque.

In one example, in step S430, when the self-driving intent prompt torque is determined according to the difference between the turning angle of the steering wheel controlled by the driver and the expected steering angle of the vehicle, and the difference between the turning angle of the steering wheel controlled by the driver and the expected steering angle of the vehicle is larger, a larger self-driving intent prompt torque is determined, and the self-driving intent prompt torque is opposite to a torque that the driver needs to provide, so that the torque that the driver needs to provide is larger.

Specifically, the steering torque applied to the steering wheel may include a steering torque applied by the driver, a steering assistance torque of a vehicle steering assistance system and the self-driving intent prompt torque. That is, the steering torque T at this moment may be determined based on the following formula:

$$\tau = \tau_{driver} + \tau_{eps} + \tau_c,$$

wherein $\tau_{driver}$ is a driver's steering torque, $\tau_{eps}$ is a steering assistance torque, and $\tau_c$ is a self-driving intent prompt torque. When the specified steering angle is zero, the torque is zero, the counterclockwise torque is positive, and the clockwise torque is negative. The computational formula of the compensation torque, that is, the self-driving intent prompt torque $\tau_c$, is determined based on the following formula:

$$\tau_c = -\text{sig}(\tau_{driver}) \cdot f(f \text{ abs}(\Delta\beta))$$

wherein $\Delta\beta$ is determined based on the following formula:

$$\Delta\beta = \beta_e - \beta_{driver}$$

wherein $\tau_{driver}$ denotes a torque currently applied by the driver, $\beta_e$ denotes an expected turning angle of self-driving, $\beta_{driver}$ denotes a turning angle where the steering wheel is located, and sig ($\tau_{driver}$) denotes the direction of the torque currently applied by the driver;

$f$ is a positive correlation function of an absolute value of $\Delta\beta$ and may satisfy the following condition:

$$\begin{cases} f(0) = 0 \\ 0 \le f\text{abs}(\tau_c) \le f\text{abs}(\tau_{eps}) \end{cases}$$

wherein $\tau_{eps}$ denotes a steering assistance torque, and $f$ abs($\tau_c$) denotes an absolute value of $\tau_c$. It should be noted that the steering torque $\tau$ required for steering at a certain moment is definite, and is determined by a resistance torque fed back by the ground. The self-driving intent prompt torque is opposite to the driver's torque. Thus, when the self-driving intent prompt torque is large (the difference between the steering angle and the expected turning angle of the vehicle is large), a larger driver torque is required to obtain the required steering torque $\tau$; as the steering angle changes, the difference between the steering angle and the expected turning angle of the vehicle changes, then the self-driving intent prompt torque changes, and the torque that the driver needs to provide also changes, thereby achieving the purpose of providing a self-driving intent to the driver.

It can be clearly seen from the above formula and analysis that, according to the steering control method of the embodiment of the present invention, after the self-driving intent prompt torque is increased, the driver may feel that it is more labor-saving to control the steering wheel to turn to the expected steering angle of the self-driving system, and it is more laborious to control the steering wheel to turn opposite to the expected steering angle of the self-driving system.

For example, it is assumed that according to the current steering angle, the total steering torque is 4 Nm (Newton meters), wherein the steering assistance torque is 3 Nm, and that when the self-driving system is not started, the driver provides an additional torque of 1 Nm. After the self-driving system is started, if the difference $\Delta\beta$ between the expected turning angle of the self-driving system and the driver's turning angle is 5 degrees, the self-driving intent prompt torque $\tau_c$ is −1 Nm, then the torque that the driver needs to provide is 2 Nm. When the difference $\Delta\beta$ between the expected turning angle of the self-driving system and the driver's turning angle is increased to 10 degrees, the self-driving intent prompt torque $\tau_c$ is −3 Nm, then the torque that the driver needs to provide becomes 4 Nm. As a result, the driver needs to provide a larger steering torque for maintaining the current turning angle. Hence, when the difference $\Delta\beta$ between the expected turning angle of the self-driving system and the driver's turning angle is large, the driver feels laborious, thereby being able to realize the inconsistency between his current operation and the expectation of the self-driving system.

According to the steering control method of the embodiment of the present invention, in one example, the self-driving intent prompt torque determination strategy may also consider the operating state of the self-driving system besides the difference between the driver's operation and the expected turning angle of the self-driving system.

For example, a reliability status of operations of the self-driving system can be determined according to the complexity of the current self-driving road environment and the severity of the lighting condition. For example, if the self-driving system detects that the current environment is complex or the lighting condition is bad, it may be in a low-reliability operating state. In such a case, the amplitude of the self-driving intent prompt torque may be reduced and the system may be similar to the conventional EPS systems. Alternatively, if the self-driving system detects that the current environment is simple and the lighting condition is good, it is in a high-reliability operating state, and the amplitude of the self-driving intent prompt torque is increased to provide an obviously enhanced driving feel for the driver's steering operation.

In the steering control method of the present embodiment, when it is not detected that the driver has operated the steering wheel, i.e., the driver has not applied the effective torque to the steering wheel, the self-driving system controls the turning angle of the steering wheel to reach the expected turning angle of the self-driving system, and the self-driving system at this time is consistent with the conventional self-driving steering control system in function.

Compared with the conventional EPS systems, the steering control method and control system for self-driving of a vehicle according to the embodiments of the present invention can inspect whether the driver's operation is consistent with the self-driving expectation according to the computing result of the self-driving system, and determine a self-driving intent prompt torque to be applied according to the degree of inconsistency, thereby being able to prompt the driver of the steering intent of the self-driving system, instead of passively assisting the driver's operation only according to the driver's operation as in the EPS system; and compared with the existing self-driving steering control system, they can affect the torque to be applied by the driver through the change of the self-driving intent prompt torque, thereby prompting the human driver of the steering intent of the self-driving system, but ensuring the coexistence of the human driver and the self-driving to avoid the conflict or exit of the self-driving state due to the difference between the driver's steering intent and the self-driving steering intent in the past.

The steering control method and the steering control system according to the present invention affect a human driving operation by changing the torque mode according to the expected steering angle computed by the self-driving system. The driver will not be forced to change his/her steering operation but can be prompted with a recommended driving behavior from the self-driving, and in most cases, the driver can participate in the process of steering control with nearly zero operation, thereby improving the safety and comfort of a driving process.

It should be noted that the vehicle in the description should be understood in a broad sense, including various large, medium and small vehicles, water vehicles, trans-atmospheric vehicles, etc.

It should be noted that relevant steps of the method may be performed locally in the vehicle, or in the cloud, or both locally and in the cloud.

It should be noted that although the steps in the flow chart are shown in a certain order, this does not mean that the steps can only be performed in this order, but as long as there is no logical interdependence between the steps, the steps may be performed in a reverse order or in parallel.

The above-described embodiments of the present invention are exemplary but not exhaustive and are not limited to the disclosure. Many modifications and alterations will be apparent to those of ordinary skill in the art without departing from the scope and spirit of the embodiments described. Therefore, the scope of the present invention shall be subjected to the scope of the claims.

The invention claimed is:

1. A method for self-driving a vehicle, comprising:
obtaining information about an expected steering angle of the vehicle based on an automatic planning control operation;
detecting whether an effective torque is applied to a steering wheel by a driver; and
determining a self-driving intent prompt torque, comprising:
in response to detecting that the driver has applied the effective torque to the steering wheel, computing a difference between a turning angle of the steering wheel controlled by the driver and the expected steering angle of the vehicle; and
determining a self-driving intent prompt torque based on a positive correlation function of a value of the difference and a direction of a steering torque applied by the driver; and
applying a steering torque to the steering wheel, wherein when the driver has applied the effective torque to the steering wheel, the steering torque applied to the steering wheel comprises a combination of the steering torque applied by the driver, a steering assistance torque applied by a vehicle steering assistance system, and the self-driving intent prompt torque, and wherein the self-driving intent prompt torque is opposite to the steering torque applied by the driver.

2. The method of claim 1, wherein determining the self-driving intent prompt torque based on the positive correlation function of the value of the difference and the direction of the steering torque applied by the driver comprises: determining a larger self-driving intent prompt torque when the difference is larger, and wherein a torque that the driver is to provide is larger if the difference is larger.

3. The method of claim 1, wherein the self-driving intent prompt torque is determined based on the following formula:

$$\tau_c = -\text{sig}(\tau_{driver}) \cdot f(f\,\text{abs}(\Delta\beta))$$

wherein $\tau_c$ is the self-driving intent prompt torque, wherein $\Delta\beta$ is determined based on the following formula:

$$\Delta\beta = \beta_e - \beta_{driver},$$

wherein $\tau_{driver}$ denotes the steering torque applied by the driver, $\beta_e$ denotes the expected steering angle of the vehicle, $\beta_{driver}$ denotes the turning angle of the steering wheel, and $\text{sig}(\tau_{driver})$ denotes the direction of the steering torque applied by the driver;
wherein $f$ is the positive correlation function of an absolute value of $\Delta\beta$ and satisfies the following conditions:

$$\begin{cases} f(0) = 0 \\ 0 \le f\,\text{abs}(\tau_c) \le f\,\text{abs}(\tau_{eps}) \end{cases},$$

and
wherein $\tau_{eps}$ denotes the steering assistance torque, and $f\,\text{abs}(\tau_c)$ denotes an absolute value of $\tau_c$.

4. The method of claim 1, further comprising:
determining a reliability status of operations of a self-driving system; and
adjusting the self-driving intent prompt torque based on the reliability status of operations of the self-driving system.

5. The method of claim 4, wherein the method for determining the reliability status of operations of the self-driving system comprises:
determining the reliability status of operations of the self-driving system based on a complexity of a current self-driving road environment and a severity of a lighting condition.

6. The method of claim 1, further comprising:
in response to detecting that the driver has not applied the effective torque to the steering wheel, controlling the turning angle of the steering wheel to reach the expected steering angle of the vehicle.

7. The method of claim 1, wherein the steering torque applied to the steering wheel is determined based on the following formula:

$$\tau = \tau_{driver} + \tau_{eps} + \tau_c,$$

wherein $\tau$ denotes the steering toque applied to the steering wheel, wherein $\tau_{driver}$ denotes the steering torque applied by the driver, wherein $\tau_{eps}$ denotes the steering assistance torque applied by the vehicle steering assistance system, and wherein $\tau_c$ denotes the self-driving intent prompt torque.

8. The method of claim 1, wherein detecting that the driver has applied the effective torque to the steering wheel comprises determining that the driver is operating the steering wheel.

9. A system for controlling a vehicle, comprising:
an expected vehicle steering angle computation unit configured to obtain information about an expected steering angle of the vehicle based on an automatic planning control operation;
a driver operation detection unit configured to detect whether an effective torque has been applied to a steering wheel by a driver; and
a self-driving intent prompt torque determination unit configured to:
compute a difference between a turning angle of the steering wheel controlled by the driver and the expected steering angle of the vehicle in response to detecting that the driver has applied the effective torque to the steering wheel; and
determine a self-driving intent prompt torque based on a positive correlation function of a value of the difference and a direction of a steering torque applied by the driver; and
a steering torque application unit configured to apply a steering torque to the steering wheel, wherein when the driver has applied the effective torque to the steering wheel, the steering torque applied to the steering wheel comprises a combination of the steering torque applied by the driver, a steering assistance torque applied by a vehicle steering assistance system, and the self-driving intent prompt torque, and wherein the self-driving intent prompt torque is opposite to the steering torque applied by the driver.

10. The system of claim 9, wherein, to determine the self-driving intent prompt torque based on the positive correlation function of the value the difference and the direction of the steering torque applied by the driver, the driver's operation detection unit is further to determine a larger self-driving intent prompt torque when the difference is larger, and wherein a torque that the driver is to provide is larger if the difference is larger.

11. The system of claim 9, wherein the self-driving intent prompt torque determination unit determines the self-driving intent prompt torque based on the following formula:

$$\tau_c = -\text{sig}(\tau_{driver}) \cdot f(f \text{ abs}(\Delta\beta))$$

wherein $\Delta\beta$ is determined based on the following formula:

$$\Delta\beta = \beta_e - \beta_{driver}$$

wherein $\tau_{driver}$ denotes the steering torque applied by the driver, $\beta_e$ denotes the expected steering angle of the vehicle, $\beta_{driver}$ denotes the turning angle of the steering wheel, and $\text{sig}(\tau_{driver})$ denotes the direction of the steering torque applied by the driver;

wherein $f$ is the positive correlation function of an absolute value of $\Delta\beta$ and satisfies the following conditions:

$$\begin{cases} f(0) = 0 \\ 0 \le f\text{abs}(\tau_c) \le f\text{abs}(\tau_{eps}) \end{cases},$$

and wherein $\tau_{eps}$ denotes the steering assistance torque, and $f$ abs($\tau_c$) denotes an absolute value of $\tau_c$.

12. The system of claim 9, a self-driving system operating state determination unit configured to:
  determine a reliability status of operations of a self-driving system; and
  adjust the self-driving intent prompt torque based on the reliability status of operations of the self-driving system.

13. The system of claim 12, wherein the self-driving system operating state determination unit is further configured to:
  determine the reliability status of operations of the self-driving system based on a complexity of a current self-driving road environment and a severity of a lighting condition.

14. The system of claim 9, further comprising:
  an automatic steering control unit configured to control the turning angle of the steering wheel to reach the expected steering angle of the vehicle in response to detecting that the driver has not applied the effective torque to the steering wheel.

15. The system of claim 9, wherein the steering torque application unit is configured to determine the steering torque applied to the steering wheel based on the following formula:

$$\tau = \tau_{driver} + \tau_{eps} + \tau_c,$$

wherein $\tau$ denotes the steering toque applied to the steering wheel, wherein $\tau_{driver}$ denotes the steering torque applied by the driver, wherein $\tau_{eps}$ denotes the steering assistance torque applied by the vehicle steering assistance system, and wherein $\tau_c$ denotes the self-driving intent prompt torque.

16. The system of claim 9, wherein, to detect that the driver has applied the effective torque to the steering wheel, the driver operation detection unit is further configured to detect that the driver is operating the steering wheel.

* * * * *